United States Patent
Adcock et al.

(10) Patent No.: US 7,873,561 B1
(45) Date of Patent: Jan. 18, 2011

(54) METHOD AND SYSTEM FOR MAINTAINING AN ORDER ON A SELECTED MARKET CENTER WITH MAXIMUM PRICE EXEMPTION PARAMETER

(75) Inventors: Paul D. Adcock, Burr Ridge, IL (US); Michael A. Cormack, Evanston, IL (US); Thomas F. Haller, Longwood, FL (US); Robert A. Hill, LaGrange, IL (US)

(73) Assignee: Archipelago Holdings, Inc., Chicago, IL (US)

( * ) Notice: Subject to any disclaimer, the term of this patent is extended or adjusted under 35 U.S.C. 154(b) by 950 days.

(21) Appl. No.: 11/122,679

(22) Filed: May 5, 2005

(51) Int. Cl.
G06Q 40/00 (2006.01)
(52) U.S. Cl. .......................... 705/37; 705/35
(58) Field of Classification Search ................... 705/35, 705/37
See application file for complete search history.

(56) References Cited

U.S. PATENT DOCUMENTS

| | | | |
|---|---|---|---|
| 5,101,353 A | 3/1992 | Lupien et al. | |
| 5,560,580 A | 10/1996 | Almoslino | |
| 5,845,266 A | 12/1998 | Lupien et al. | |
| 5,905,974 A | 5/1999 | Fraser et al. | |
| 5,950,176 A | 9/1999 | Keiser et al. | |
| 6,012,046 A * | 1/2000 | Lupien et al. | 705/36 R |
| 6,098,051 A * | 8/2000 | Lupien et al. | 705/36 R |
| 6,278,982 B1 | 8/2001 | Korhammer | |
| 6,343,278 B1 | 1/2002 | Jain et al. | |
| 6,377,940 B2 | 4/2002 | Tilfors et al. | |
| 6,405,180 B2 * | 6/2002 | Tilfors et al. | 705/36 R |
| 6,408,282 B1 | 6/2002 | Buist | |
| 7,249,086 B2 | 7/2002 | Bloom et al. | |
| 6,505,174 B1 | 1/2003 | Keiser et al. | |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |

(Continued)

FOREIGN PATENT DOCUMENTS

AU 2006/244479 11/2006

(Continued)

OTHER PUBLICATIONS

Tseng, K.C., Supermontage as a New Trading System of NASDAQ, Investment Management and Financial Innovations, © Mar. 2005.*
Response to Final, Sep. 30, 2009 for U.S. Appl. No. 11/416,942.
Examiner Interview Summary Record, Mar. 31, 2009 for U.S. Appl. No. 11/416,943.
Nonfinal Rejection, Sep. 30, 2009 for U.S. Appl. No. 11/416,943.
NASDAQ Launches Liquidity Tracker, HighBeam Research, Dec. 5, 2002.

(Continued)

*Primary Examiner*—Charles R Kyle
*Assistant Examiner*—Robert R Niquette
(74) *Attorney, Agent, or Firm*—Milbank Tweed Hadley & McCloy LLP

(57) ABSTRACT

A posting market center and process are disclosed for maintaining a market center-restricted order on a selected market center. In a market which allows price exemptions, the market center and process disclosed hide a received market center-restricted order which technically crosses or locks the away market, but would be marketable if an acceptable contra-side order was then available in the posting market center's internal order book. The posting market center then maintains this hidden order until it is fully executed, is canceled or can be displayed on the public order book.

48 Claims, 5 Drawing Sheets

U.S. PATENT DOCUMENTS

| | | |
|---|---|---|
| 6,832,210 B1 | 12/2004 | Li |
| 6,850,907 B2 | 2/2005 | Lutnick et al. |
| 6,963,856 B2 | 11/2005 | Lutnick et al. |
| 6,983,260 B2 | 1/2006 | Hummelgren |
| 7,162,448 B2 | 1/2007 | Madoff et al. |
| 7,184,982 B1 | 2/2007 | Howorka et al. |
| 7,197,483 B2 | 3/2007 | Brady et al. |
| 7,209,896 B1* | 4/2007 | Serkin et al. .................. 705/37 |
| 7,225,153 B2 | 5/2007 | Lange |
| 7,242,669 B2 | 7/2007 | Bundy et al. |
| 7,246,090 B1 | 7/2007 | Thomas |
| 7,246,093 B1 | 7/2007 | Katz |
| 7,356,498 B2 | 4/2008 | Kaminsky et al. |
| 7,383,220 B1 | 6/2008 | Keith |
| 7,401,046 B2 | 7/2008 | Hollerman et al. |
| 7,685,057 B2 | 10/2008 | Chiulli et al. |
| 7,467,110 B2 | 12/2008 | Muller et al. |
| 2001/0037284 A1 | 11/2001 | Finkelstein et al. |
| 2002/0010672 A1 | 1/2002 | Waelbroeck et al. |
| 2002/0010673 A1 | 1/2002 | Muller et al. |
| 2002/0019795 A1 | 2/2002 | Madoff et al. |
| 2002/0019799 A1 | 2/2002 | Ginsberg et al. |
| 2002/0042765 A1 | 4/2002 | Dawson |
| 2002/0062273 A1 | 5/2002 | Perkel et al. |
| 2002/0082979 A1 | 6/2002 | Sands et al. |
| 2002/0091617 A1 | 7/2002 | Keith |
| 2002/0091621 A1 | 7/2002 | Conklin et al. |
| 2002/0120511 A1 | 8/2002 | Hanes |
| 2002/0128951 A1 | 9/2002 | Kiron et al. |
| 2002/0128955 A1 | 9/2002 | Brady et al. |
| 2002/0128958 A1 | 9/2002 | Slone |
| 2002/0143676 A1 | 10/2002 | Kiron et al. |
| 2002/0147670 A1 | 10/2002 | Lange |
| 2002/0161687 A1* | 10/2002 | Serkin et al. .................. 705/37 |
| 2002/0169703 A1 | 11/2002 | Lutnick et al. |
| 2002/0184135 A1 | 12/2002 | Zakaria |
| 2002/0184136 A1* | 12/2002 | Cleary Neubert et al. ..... 705/37 |
| 2002/0198815 A1 | 12/2002 | Greifeld et al. |
| 2002/0198816 A1 | 12/2002 | Gilbert et al. |
| 2003/0004851 A2 | 1/2003 | Kiron et al. |
| 2003/0004858 A1 | 1/2003 | Schmitz et al. |
| 2003/0009400 A2 | 1/2003 | Kiron et al. |
| 2003/0009412 A1 | 1/2003 | Furbush et al. |
| 2003/0009413 A1 | 1/2003 | Furbush et al. |
| 2003/0009414 A1 | 1/2003 | Furbush et al. |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0083974 A1 | 5/2003 | Bunda |
| 2003/0093343 A1 | 5/2003 | Huttenlocher et al. |
| 2003/0097328 A1 | 5/2003 | Lundberg et al. |
| 2003/0115131 A1 | 6/2003 | Heaton et al. |
| 2003/0130920 A1 | 7/2003 | Freund |
| 2003/0130925 A1 | 7/2003 | Malitzis |
| 2003/0130926 A1 | 7/2003 | Moore |
| 2003/0135443 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwalter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 | 12/2003 | Salvadori et al. |
| 2004/0030630 A1* | 2/2004 | Tilfors et al. .................. 705/37 |
| 2004/0044610 A1 | 3/2004 | Fraser et al. |
| 2004/0059666 A1 | 3/2004 | Waelbroeck et al. |
| 2004/0088242 A1 | 5/2004 | Ascher et al. |
| 2004/0143538 A1 | 7/2004 | Korhammer et al. |
| 2004/0143542 A1 | 7/2004 | Magill et al. |
| 2004/0177024 A1 | 9/2004 | Bok et al. |
| 2004/0177026 A1 | 9/2004 | Balabon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Churquina |
| 2004/0236662 A1 | 11/2004 | Korhammer et al. |
| 2004/0236669 A1 | 11/2004 | Horst et al. |
| 2004/0243502 A1 | 12/2004 | Slowik et al. |
| 2004/0254804 A1 | 12/2004 | Peterffy et al. |
| 2004/0254877 A1 | 12/2004 | Buckwalter et al. |
| 2004/0267655 A1 | 12/2004 | Davidowitz et al. |
| 2005/0010481 A1 | 1/2005 | Lutnick et al. |
| 2005/0075963 A1 | 4/2005 | Balabon |
| 2005/0096999 A1 | 5/2005 | Newell et al. |
| 2005/0119964 A1 | 6/2005 | Brady et al. |
| 2005/0125316 A1 | 6/2005 | Levering et al. |
| 2005/0137962 A1* | 6/2005 | Penney et al. .................. 705/37 |
| 2005/0160024 A1 | 7/2005 | Soderborg et al. |
| 2005/0171887 A1* | 8/2005 | Daley et al. .................. 705/37 |
| 2005/0171888 A1* | 8/2005 | Daley et al. .................. 705/37 |
| 2005/0171889 A1* | 8/2005 | Daley et al. .................. 705/37 |
| 2005/0171890 A1* | 8/2005 | Daley et al. .................. 705/37 |
| 2005/0171891 A1* | 8/2005 | Daley et al. .................. 705/37 |
| 2005/0171895 A1 | 8/2005 | Howorka et al. |
| 2005/0197916 A1 | 9/2005 | Newell et al. |
| 2005/0222936 A1* | 10/2005 | Panariti et al. ................ 705/37 |
| 2005/0228739 A1 | 10/2005 | Leibowitz |
| 2005/0240510 A1 | 10/2005 | Schweichert et al. |
| 2005/0273407 A1 | 12/2005 | Black et al. |
| 2005/0273408 A1 | 12/2005 | Bandman et al. |
| 2005/0273419 A1 | 12/2005 | Ogg et al. |
| 2005/0283415 A1 | 12/2005 | Studnitzer et al. |
| 2005/0283421 A1 | 12/2005 | Hatheway et al. |
| 2005/0283426 A1 | 12/2005 | Krishnasami et al. |
| 2005/0283427 A1 | 12/2005 | Owens et al. |
| 2006/0020536 A1 | 1/2006 | Renton et al. |
| 2006/0031157 A1 | 2/2006 | Gianakouros et al. |
| 2006/0089898 A1 | 4/2006 | Durkin et al. |
| 2006/0089899 A1 | 4/2006 | Durkin et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 | 7/2006 | Littlewood |
| 2006/0184444 A1 | 8/2006 | McConaughy et al. |
| 2006/0206404 A1 | 9/2006 | Hatheway et al. |
| 2006/0206407 A1 | 9/2006 | Troxel et al. |
| 2006/0235786 A1 | 10/2006 | DiSalvo |
| 2006/0253374 A1* | 11/2006 | Addock et al. ................ 705/37 |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0055607 A1 | 3/2007 | Wunsch et al. |
| 2007/0078753 A1* | 4/2007 | Cormack et al. ............. 705/37 |
| 2007/0112693 A1 | 5/2007 | Cushing |
| 2007/0198391 A1 | 8/2007 | Dreyer et al. |
| 2007/0244792 A1 | 10/2007 | Couperier et al. |
| 2008/0040290 A1 | 2/2008 | Harris |
| 2010/0030704 A1 | 2/2010 | Griffin et al. |

FOREIGN PATENT DOCUMENTS

| | | |
|---|---|---|
| AU | 2006/244483 | 11/2006 |
| AU | 2006/244499 | 11/2006 |
| AU | 2006/244562 | 11/2006 |
| AU | 2006/244563 | 11/2006 |
| AU | 2006/244564 | 11/2006 |
| AU | 2006/244566 | 11/2006 |
| EP | 1 321 870 | 9/2003 |
| JP | 2008/510226 | 11/2007 |
| JP | 2008/510109 | 11/2008 |
| JP | 2008/510110 | 11/2008 |

| | | |
|---|---|---|
| JP | 2008/510238 | 11/2008 |
| SG | 2007/166754 | 11/2007 |
| SG | 2007/166770 | 11/2007 |
| SG | 2007/166788 | 11/2007 |
| SG | 2007/166796 | 11/2007 |
| SG | 2007/166804 | 11/2007 |
| SG | 2007/166812 | 11/2007 |
| SG | 2007/166762 | 12/2007 |
| WO | WO 01/22322 * | 3/2001 |
| WO | WO 01/22339 | 3/2001 |
| WO | WO 01/52166 | 7/2001 |
| WO | WO 01/75733 | 10/2001 |
| WO | WO 01/90925 | 11/2001 |
| WO | WO 02/07039 | 1/2002 |
| WO | WO 02/09008 | 1/2002 |
| WO | WO 2004/008296 | 1/2004 |
| WO | WO 2005/010790 | 2/2005 |
| WO | WO 2005/036354 | 4/2005 |
| WO | 2006016683 | 11/2006 |
| WO | 2006016684 | 11/2006 |
| WO | 2006016685 | 11/2006 |
| WO | 2006016701 | 11/2006 |
| WO | 2006017249 | 11/2006 |
| WO | 2006017253 | 11/2006 |
| WO | 2006017296 | 11/2006 |
| WO | 2006036461 | 4/2007 |
| WO | 2006036878 | 4/2007 |
| WO | 2007016572 | 1/2008 |
| WO | 2007016682 | 1/2008 |
| WO | 2007016856 | 1/2008 |
| WO | 2007016857 | 1/2008 |
| WO | 2007016718 | 2/2008 |
| WO | 2007016571 | 3/2008 |
| WO | 2007024921 | 6/2008 |

OTHER PUBLICATIONS

Response to Nonfinal, Sep. 29, 2009 for U.S. Appl. No. 11/634,020.
Response to Final, Oct. 19, 2009 for U.S. Appl. No. 11/416,913.
International Search Report, Oct. 14, 2009 for SG2007166754.
International Search Report, Oct. 2, 2009 for SG2007166812.
Nonfinal Rejection, Aug. 17, 2009 for U.S. Appl. No. 11/416,710.
Response to Nonfinal, Nov. 2, 2009 for U.S. Appl. No. 11/416,710.
Response to Final, Oct. 7, 2009 for U.S. Appl. No. 11/416,942.
Examiner Interview Summary, Oct. 14, 2009 for U.S. Appl. No. 11/416,942.
Nonfinal Rejection, Oct. 7, 2009 for U.S. Appl. No. 11/345,421.
Response to Nonfinal, Nov. 6, 2009 for 416,756.
A Taxonomy of Automated Trade Execution Systems, Ian Domowitz, Journal of International Money and Finance, (1993), 12, pp. 607-631.
Roger D. Huang et al., Tick Size, Bid-Ask Spreads and Market Structure, Working Paper 99-05 Version: Feb. 8, 2001; Forthcoming Journal of Financial and Quant. Analysis p. 1-29.
Bart Frijns et al., Price discovery in tick time, Journal of Empirical Financial, vol. 16, Issue 5, Dec. 2009, p. 759-776.
Notice of Allowance for U.S. Appl. No. 11/416,942 on Feb. 24, 2010.
Notice of Allowance for U.S. Appl. No. 11/122,689 on Mar. 1, 2010.
Apr. 2, 2010 Notice of Allowance for U.S. Appl. No. 11/345,421.
Mar. 22, 2010 Notice of Allowance for U.S. Appl. No. 11/416,710.
Mar. 23, 2010 Nonfinal Rejection for U.S. Appl. No. 11/416,943.
Mar. 17, 2010 Response to Final for U.S. Appl. No. 11/634,020.
Dec. 1, 2009 Nonfinal Rejection for U.S. Appl. No. 11/881,789.
Mar. 19, 2010 Response to Nonfinal for U.S. Appl. No. 11/881,789.
Jun. 16, 2010 Response to Final Rejection for U.S. Appl. No. 11/122,498.
Jul. 1, 2010 Notice of Allowance for U.S. Appl. No. 11/122,498.
Jun. 16, 2010 U.S. Appl. No. Notice of Allowance for 11/416,942.
Jun. 15, 2010 Notice of Allowance for U.S. Appl. No. 11/416,710.
Jun. 22, 2010 Response to Final Rejection for U.S. Appl. No. 11/416,913.
Apr. 27, 2010 Final Rejection for U.S. Appl. No. 11/416,756.
Jun. 23, 2010 Response to Non-Final Rejection for U.S. Appl. No. 11/416,943.
Jul. 6, 2010 Proposed Examiner's Amendment for U.S. Appl. No. 11/525,363.
Apr. 28, 2010 Non-Final Rejection for U.S. Appl. No. 11/634,020.
Jul. 28, 2010 Response to Non-Final Rejection for U.S. Appl. No. 11/634,020.
Jul. 6, 2010 Non-Final Rejection for U.S. Appl. No. 11/880,840.
May 3, 2010 Response to Non-Final Rejection for U.S. Appl. No. 11/880,686.
Jul. 21, 2010 Final Rejection for U.S. Appl. No. 11/880,686.
Jun. 30, 2010 Non-Final Rejection for U.S. Appl. No. 11/881,064.
Jun. 29, 2010 Non-Final Rejection for U.S. Appl. No. 11/881,788.
Aug. 3, 2010 Notice of Abandonment for U.S. Appl. No. 11/527,797.
Aug. 4, 2010 Notice of Allowance and Issue Fee Due for U.S. Appl. No. 11/345,421.
Jul. 2, 2009 EIC3600 Search Report for U.S. Appl. No. 11/345,420.
Aug. 18, 2010 Final Rejection for U.S. Appl. No. 11/880,852.
Aug. 20, 2010 Restriction Requirement for U.S. Appl. No. 11/881,789.
U.S. Appl. No. 61/191,055, Neuner, et al.
U.S. Appl. No. 11/881,788, published Jun. 18, 2009, Adcock et al.
U.S. Appl. No. 11/881, 789, published Sep. 18, 2009 Adcock, et al.
U.S. Appl. No. 11/881,064, published Sep. 18, 2009, Adcock, et al.
U.S. Appl. No. 11/880,852, published May 14, 2009, Armstrong, et al.
U.S. Appl. No. 11/880,686, published Jan. 29, 2009, Haller, et al.
U.S. Appl. No. 11/880,840, published Mar. 12, 2009, Adcock, et al.
U.S. Appl. No. 11/634,020, published Nov. 9, 2006, Adcock, et al.
U.S. Appl. No. 11/122,498, Brill, et al.
U.S. Appl. No. 11/527,797, published Mar. 29, 2007, Drake et al.
U.S. Appl. No. 11/525,363, published Apr. 5, 2007, Cormack, et al.
U.S. Appl. No. 11/416,710, published Nov. 9, 2006, Adcock, et al.
U.S. Appl. No. 11/416,943, published Nov. 9, 2006, Adcock, et al.
U.S. Appl. No. 11/416,942, published Nov. 9, 2006, Adcock, et al.
U.S. Appl. No. 11/345,421, published Nov. 9, 2006, Adcock, et al.
U.S. Appl. No. 11/416,756, published Nov. 9, 2006, Adcock, et al.
U.S. Appl. No. 11/345,420, published Nov. 9, 2006, Adcock, et al.
U.S. Appl. No. 11/122,689, published Jul. 27, 2010, Adcock, et al.
U.S. Appl. No. 11/122,679, Adcock, et al.
U.S. Appl. No. 11/416,913, published Nov. 9, 2006, Adcock, et al.
U.S. Appl. No. 60/721,165, Drake, et al.
U.S. Appl. No. 12/807,338, Adcock, et al.
John Hintze, Direct Order Decision Polarizes Exchanges, Security Industry News, Jun. 13, 2005, Securities Data Publishing.
Peter Chapman, Special Feature: Fragmented Dealing Under Fire, Traders, May 1, 2000, Securities Data Publishing.
Sep. 7, 2010 Notice of Allowance, for U.S. Appl. No. 11/345,420.
Aug. 31, 2010 Notice of Allowance, for U.S. Appl. No. 11/122,498.
Sep. 14, 2010 Notice of Allowance, for U.S. Appl. No. 11/122,498.
Sep. 29, 2010 Notice of Allowance, for U.S. Appl. No. 11/122,498.
Oct. 13, 2010 Supplemental Notice of Allowability, for U.S. Appl. No. 11/122,498.
Sep. 20, 2010 Notice of Allowance, for U.S. Appl. No. 11/416,942.
Sep. 27, 2010 Notice of Allowance, for U.S. Appl. No. 11/416,710.
Sep. 15, 2010 Final Rejection, for U.S. Appl. No. 11/416,913.
Aug. 26, 2010 Final Rejection, for U.S. Appl. No. 11/416,943.
Sep. 24, 2010 Notice of Allowance, for U.S. Appl. No. 11/525,363.
Sep. 2, 2010 Response to Restriction Requirement, for U.S. Appl. No. 11/881,789.
Sep. 29, 2010 Response to Non-final, for U.S. Appl. No. 11/881,788.
Nov. 9, 2010 Supplemental Notice of Allowability, for U.S. Appl. No. 11/416,942.
Oct. 27, 2010 Notice of Allowance, for U.S. Appl. No. 11/634,020.
Jun. 11, 2009 EIC3600 Search Report, for U.S. Appl. No. 11/634,020.
Nov. 4, 2010 Response to Non-final, for U.S. Appl. No. 11/880,840.
Nov. 15, 2010 Response to Final, for U.S. Appl. No. 11/880,686.
Nov. 15, 2010 Notice of Allowance and Interview Summary, for U.S. Appl. No. 11/881,788.

* cited by examiner

METHOD AND SYSTEM FOR MAINTAINING AN ORDER ON A SELECTED MARKET CENTER WITH MAXIMUM PRICE EXEMPTION PARAMETER

BACKGROUND

Regulations and established rules dictate how financial instrument market centers, including securities market centers, must interact with one another and, specifically, how orders are to be handled among market centers. Some present market center rules and regulations for some markets dictate that when an order is placed on a market center, it is to be executed at the best bid or offer price presently available in the entire market ("Market. Best Bid" or "Market Best Offer"), regardless of whether the market center that the order was sent to is presently offering the best bid or best offer price. If a market center receives an incoming marketable order (i.e. an order whose price is at or better than the opposite side of the Market Best Bid or Best Offer price) and cannot match that order within its own order book, then that market center must route all or part of the order to the market center then presently posting the Market Best Bid or Best Offer price.

While these rules and regulations are designed to give a securities trader the benefit of having his order executed at the best price available in the market at the time, traders sometimes want their orders only executed on the market center to which they sent the order, trading off speed of execution versus best price. These traders do not want their orders to leave the market center to which it was sent. Traders can make this request as long as their order does not lock or cross the away market. A trader's order would lock the away market if the trader's order price has the same price as the Market Best Bid or Best Offer price then available on the opposing side of the market (i.e. the trader's buy order price is equal to the Market Best Offer price or the trader's sell price is equal to the Market Best Bid price). A trader's order price would cross the away market if a trader's buy order price is higher than the Market Best Offer price or if a trader's sell order price is lower than the Market Best Bid price. Such trades are not allowed, according to presently applicable rules and regulations in some markets, because, if allowed to execute, they would create an anomaly in the market where one market center is executing orders at prices that are outside of the Market Best Bid or Best Offer price (i.e. outside of the "inside spread"). As a result, in prior systems, if a trader's market center-restricted order locks or crosses the away market, it is canceled. Traders in prior systems typically have to choose between pricing an order aggressively to maximize trading opportunities or risk having the order cancelled because the trader has priced it through the market (i.e. priced it so that it would lock or cross the away market).

With some securities or financial instruments in certain issues, however, market centers are granted a limited price exemption wherein a market center having a market center-restricted order can "trade through" a potential away market lock or cross up to a specified amount. In such circumstances, canceling a market center-restricted order that is not immediately marketable because it crosses or locks the market, as is presently the practice, is excessive because this same order would be marketable if an acceptable contra-side order was then available in the posting market center's order book.

Accordingly, there is a need for a market center order processing method and system where a trader can designate that an order only execute on a specific market center and that order, in a limited price exemption environment, will not be cancelled if it locks or crosses the away market.

SUMMARY

According to an aspect of the present invention, a method for processing an incoming market center-restricted order includes providing a posting market center having an internal order book and a public order book. It further includes receiving a market center-restricted order specifying a financial instrument and a price and retrieving a best away market price in the specified financial instrument. It further includes determining whether the price of the market center-restricted order locks or crosses the best away market price, such that when the price of the market restricted order locks or crosses the best away market price, the market restricted order is inserted into the posting market center internal order book as a hidden order which is not displayed on the posting market center public order book.

DESCRIPTION OF THE DRAWINGS

These and other features, aspects and advantages of the present invention will become better understood with regard to the following description, appended claims and accompanying drawings where:

DETAILED DESCRIPTION

Figure 1:
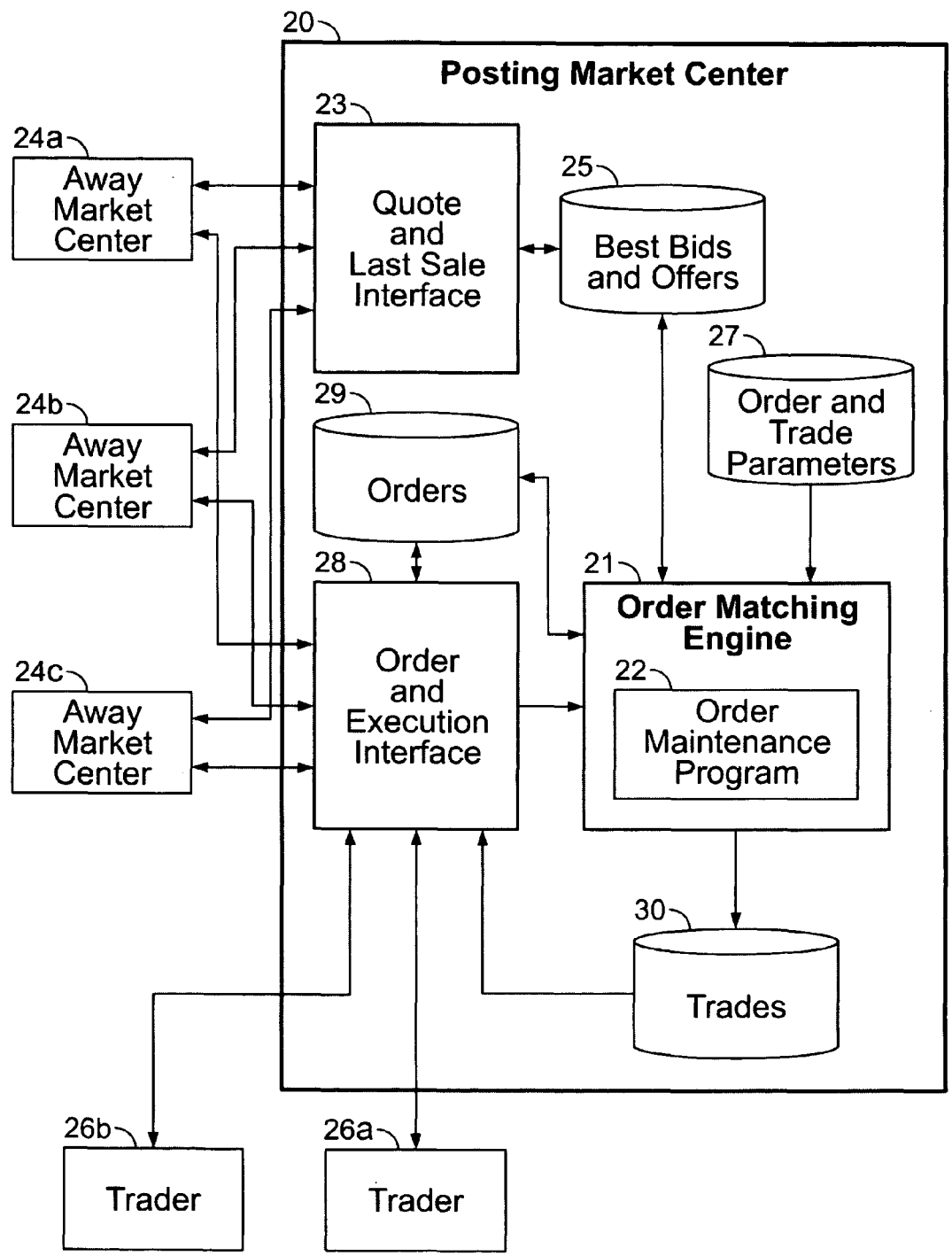
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity security market center environment, but it should be understood that the present invention could be used in any type of financial instrument market center environment (e.g., securities, futures contracts, options, bonds, etc.). The trading environment of this embodiment includes a posting market center 20 which interacts with a number of other market centers 24 (i.e. away market centers) and traders 26. It should be understood that the posting market center 20 referred to herein refers to a computing system having sufficient processing and memory capabilities and does not refer to a specific physical location. In fact, in certain embodiments, the computing system may be distributed over several physical locations. It should also be understood that any number of traders 26 or away market centers 24 can interact with the posting market center 20. The posting market center 20 is the market center on which a specific trader 26 posts a specific order. The posting market center 20 includes an order matching engine 21, which validates, matches and processes all orders on the market center 20. In this embodiment, the order matching engine 21 includes an order maintenance program 22, which functions to hide and track a market center-restricted price exempted order that would technically be considered "locking" or "crossing" an away market until such order can be displayed at its order price on the posting market center 20. The order maintenance program 22 may also be utilized as stand alone code separate and apart from the order matching engine 21. In this embodiment, the code for the order matching engine 21 and for the order maintenance program 22 are stored in the posting market center's memory.

The posting market center 20 may also include a quote and last sale interface 23 that interacts with the away market centers 24 to capture quote and last sale information. This information is stored to a best bids and offers data structure 25. This data structure 25 is where the Market Best Bid and Offer information is stored. The posting market center 20 may also include an order and trade parameters data structure 27. The order and trade parameters data structure 27 stores predefined trading parameters and rules that are used by the order matching engine 21 in matching orders and executing trades. The posting market center 20 may also include an order and execution interface 28 which interacts with the traders 26, the away market centers 24 and the order matching engine 21 in the order execution process. The posting market center 20 may also include an order information data structure 29 where order information is stored and a trade information data structure 30 where completed trade information is stored.

Throughout the discussion herein, it should be understood that the details regarding the operating environment, data structures, and other technological elements surrounding the posting market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Incoming Market Center-Restricted Buy Order

Figure 2:
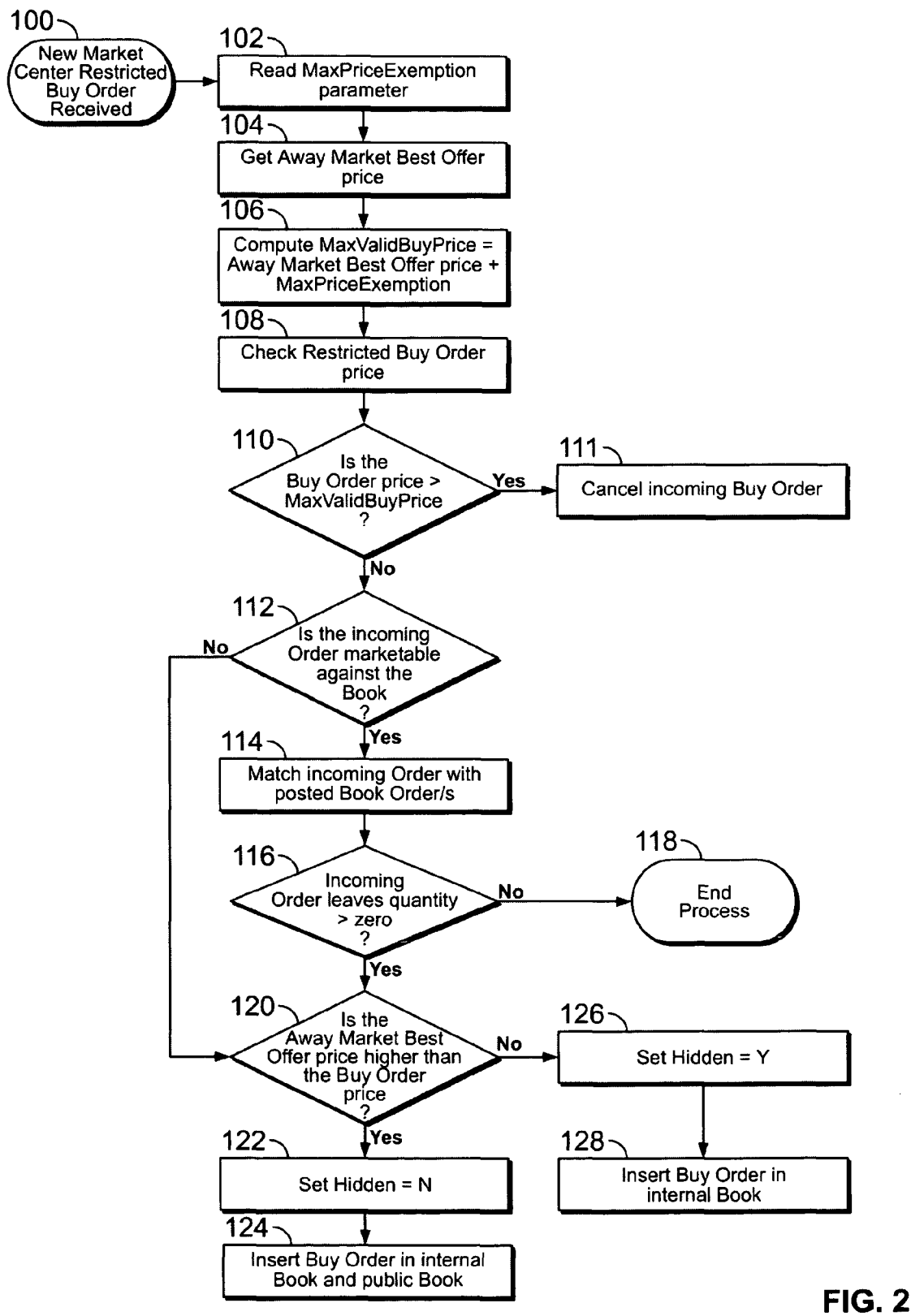
FIG. 2 is a flow diagram illustrating a process implemented by an embodiment of the present invention for incoming market center-restricted buy orders.

FIG. 2 illustrates the process implemented by the order maintenance program 22 where a trader 26 sends a buy order to the posting market center 20 with instructions that the buy order only be executed on the posting market center 20 (i.e. a market center-restricted buy order) and the away market is at the Market Best Offer price. At step 100, a new market center-restricted buy order is received by the order matching engine 21, and the order matching engine 21, recognizing the market center restriction, initiates the order maintenance program 22. At step 102, the process reads a maximum price exemption parameter (e.g. "MaxPriceExemption") from the order and trade parameters data structure 27. Depending on the applicable rules, a posting market center 20 is allowed to trade specified securities at prices that are worse than a better-priced market center up to a specified amount. This amount is the maximum price exemption parameter. The maximum price exemption parameter may be set differently for different securities. For example, the maximum price exemption may be set to 3¢ for one security and may be set to 5¢ for another security. The maximum price exemption parameter could also be set to zero, meaning that in practice no trade through is allowed. The posting market center 20 of the present invention is able to handle differing securities having differing maximum price exemptions. At step 104, the process gets the away market best offer price from the data structure 25. At step 106, the process computes the maximum price that the incoming buy order can be at to be a valid exempt order ("MaxValidBuyPrice"). When the away market is the Market Best Offer, the maximum price that a market center-restricted buy order can be at and still be valid is equal to the away market best offer price plus the maximum price exemption. For example, if the away market best offer price is $20 and the maximum price exemption is 3¢, then the maximum valid buy price for a market center-restricted buy order is $20.03. In this example, any market center-restricted buy order above $20.03 would be invalid and would be canceled. At step 108, the process checks the price of the market center-restricted buy order.

At step 110, the process checks to see if the price of the market center-restricted buy order is greater than the computed maximum valid buy order price parameter. If the buy order price is greater than the maximum valid buy order price parameter, then the order is canceled, as indicated at step 111. If the buy order price is less than or equal to (not greater than) the maximum valid buy order price parameter, then the order proceeds to step 112 where its marketability against the posting market center's book is assessed. At step 112, the process checks to see if the buy order is marketable. If the buy order is marketable, the process proceeds to step 114 where the order matching engine 21 trades the new buy order against standing orders posted in the posting market center's order book according to the market center's trading rules. Then, at step 116, the process checks to see if the buy order still has any quantity remaining on the order to be traded. If the buy order does not, then the order is complete, and the process ends with respect to this order, as indicated at 118. If the order is not complete and still has quantity remaining to be traded, the process proceeds to step 120. Referring back to step 112, if the incoming buy order is not marketable, the process proceeds to step 120 at this point as well.

At step 120, the away market best offer price is compared to the restricted buy order price to see if the away market best offer price is higher than the restricted buy order price. If the away market best offer price is higher than the restricted buy order price, then the buy order will not lock or cross the away market. In this instance, the program proceeds to step 122 where a parameter, in this example named Hidden, is set to "N". Setting Hidden equal to "N" means that the program 22 displays the buy order on the posting market center 20 because the buy order does not lock or cross the away market. Then at step 124, the market center-restricted buy order is inserted and displayed on the posting market center's internal and public order book according to normal price/time priority rules for limit orders.

Referring back to step 120, if the process determines that the away market best offer price is not higher than the restricted buy order price (i.e. the away market best offer price is equal to or less than the restricted buy order price), then this buy order would lock or cross the market if it was displayed on the posting market center's public order book. The process, at this point, then acts to protect the away market centers 24 while not canceling the order, as would have been done with prior systems. At step 126, the process sets the Hidden parameter to "Y" so the system knows for later checks that the order price has been hidden. At step 128, the order is inserted into the posting market center's internal order book according to the price/time priority rules. The restricted buy order, in this example, is not posted to nor displayed on the public order book at this point. It is hidden from the public market.

Example 1

Incoming Market Center-Restricted Buy Order
(Away Market Center at Best Offer Price with 3¢ Price Exemption in Effect)

An example of a new restricted buy order posted to a posting market center 20 is provided below. It should be understood that the order prices and market prices discussed in this example are by way of example only to illustrate how the process of an embodiment of the invention handles a market center-restricted buy order.

In this example, the Market Best Bid is $19.95 and the Market Best Offer is $20.00. An Away Market Center A is quoting 800 @ $19.95 to 300 @ $20.00. The posting market center 20 has a limit sell order for 300 @ $20.01 in the market. A 3¢ price exemption rule is in effect for the market discussed in this example for this security. Some present markets allow such a 3¢ price exemption for certain exchange-traded fund ("ETF") products. It should also be understood that a 3¢ price exemption is shown by way of example only and that any amount of price exemption (e.g. 0, 5¢, 6¢, 10¢, 12¢, etc.) could be applied to the present invention without departing from the scope or spirit of the invention. The posting market center internal book in this example appears as follows:

| Bids | Offers |
| --- | --- |
| Away Market Center A 800 @ 19.95 | Away Market Center A 300 @ 20.00 |
| | Order X: 300 @ 20.01 |

The posting market center 20 receives the four incoming market center-restricted buy orders stated below in the following sequence and processes each order in accordance with the process of FIG. 2.

Order A: Buy 200 @ $19.99 (lower than the Market Best Offer price)
Order B: Buy 600 @ $20.00 (same as the Market Best Offer price)
Order C: Buy 700 @ $20.03 (higher than the Market Best Offer price)
Order D: Buy 300 @ $20.04 (higher than the Market Best Offer price)

Order A:

For Order A, the market center receives Order A at step 100. At step 102, the process reads the maximum price exemption parameter (MaxPriceExemption), which in this example is 3¢. Then, at step 104, the process gets the away market best offer price from the data structure 25, which in this example is $20. At step 106, the process computes the maximum price that Order A can be at to be a valid exempt order ("MaxValidBuyPrice"). In this example, the maximum valid buy price for a buy order is $20.03 (i.e. the away market best offer price of $20 plus the maximum price exemption of 3¢). At step 108, the process checks the price of Order A, which in this case is $19.99.

At step 110, the process checks to see if the price of Order A ($19.99) is greater than the computed maximum valid buy order price parameter ($20.03). In this case, Order A's price is not greater; so, the process proceeds to step 112 where Order A's marketability against the posting market center's book is assessed. In this case, Order A is not marketable because Order A is priced at $19.99, and this is lower than any offers presently in the market. Accordingly, the process proceeds to step 120. At step 120, the process compares the away market best offer price to Order A's price. In this case, the away market best offer price ($20) is higher than Order A's restricted buy order price ($19.99), so the process continues on to step 122, setting the Hidden parameter to "N" since Order A's price does not need to be hidden. At step 124, Order A is inserted into the posting market center's internal and public order book and is displayed as an order to buy at $19.99.

Order B:

For Order B, the market center receives Order B at step 100. At step 102, the process again reads the maximum price exemption parameter (MaxPriceExemption), which in this example is 3¢. Then, as before, at step 104, the process gets the away market best offer price, which in this example is $20 again. At step 106, the process computes the maximum price that Order B can be at to be a valid exempt order ("MaxValidBuyPrice"). In this example, the maximum valid buy price for a buy order is $20.03 (i.e. the away market best offer price of $20 plus the maximum price exemption of 3¢). At step 108, the process checks the price of Order B, which in this case is $20.

At step 110, the process checks to see if the price of Order B ($20) is greater than the computed maximum valid buy order price parameter ($20.03). In this case, as with Order A, Order B's price is not greater; so, the process proceeds to step 112 where Order B's marketability against the posting market center's book is assessed. As with Order A, Order B is not marketable. Even though Order B is priced at $20 and there is an offer in the market at $20, Order B is a restricted buy order and, as such, cannot execute against the offer at $20 on Away Market Center A. Accordingly, the process proceeds to step 120. At step 120, the process compares the away market best offer price to the restricted buy order price. In this case, the away market best offer price ($20) is equal to Order B's restricted buy order price ($20), so the process continues on to step 126, setting the Hidden parameter to "Y" since Order B's price needs to be hidden from the public market. At step 128, Order B is inserted into the posting market center's internal order book and hidden from the public order book. It should be noted that although Order B is hidden from the public order book, it will trade with incoming sell orders on the posting market center 20 priced at $20 or lower according to the posting exchange's normal price/time priority rules for matching orders in the internal order book.

Order C:

For Order C, the market center receives Order C at step 100. As with Orders A and B, the process proceeds through steps 102 to 106 to determine that the maximum valid buy price for a buy order is $20.03. At step 108, the process checks the price of Order C, which in this case is $20.03. At step 110, the process checks to see if the price of Order C ($20.03) is greater than the computed maximum valid buy order price parameter ($20.03). In this case, as with Orders A and B, Order C's price is not greater; so, the process proceeds to step 112 where Order C's marketability against the posting market center's book is assessed. In this example, Order C is marketable. Order C is priced at $20.03, and the best posting market center offer price is $20.01 (Order X). So, Order C can execute, at least partially, against Order X. Away Market Center A still has the Market Best Offer price at $20. However, in this example, because a 3¢ price exemption is in effect, the posting market center 20 can trade up to 3¢ above Away Market Center A's better price, which in this example means the posting exchange can execute trades up to $20.03. As such, in this example, at step 114, 300 shares of Order C trade against the 300 shares of Order X at Order X's price of $20.01. At step 116, the process checks to see if Order C has any quantity remaining. In this instance, Order C does. It has 400 shares remaining. Accordingly, the process proceeds to step 120. At step 120, the process compares the away market best offer price to Order C's price. In this instance, the away market best offer price ($20) is lower than Order C's restricted buy order price ($20.03), so the process continues on to step 126, setting the Hidden parameter to "Y" for the remainder of Order C since Order C's price needs to be hidden from the public market. At step 128, Order C is inserted into the posting market center's internal order book and hidden from the public order book. It should be noted that, as with Order B, although Order C is hidden from the public order book, it will trade with incoming sell orders on the posting market center 20 priced at $20.03 or lower according to the posting exchange's normal price/time priority rules for matching orders in the internal order book.

Order D:

For Order D, as with Orders A, B and C, the process proceeds through steps 100 to 106 to determine that the maximum valid buy price for a buy order is $20.03. At step 108, the process checks the price of Order D, which in this case is $20.04. At step 110, the process checks to see if the price of Order D ($20.04) is greater than the computed maximum valid buy order price parameter ($20.03). In this case, Order D's price is greater than the computed maximum valid buy order price parameter ($20.04>$20.03); so, the process proceeds to step 111 where Order D is canceled. It should be noted that even though Order D is canceled in this embodiment, in other embodiments, Order D could be moved to a separate holding area where it would be held until the away market best offer price moved higher allowing Order D to be posted on the internal book at that time.

After processing Orders A, B, C and D in this example, the posting market center posts the remaining orders to its internal book according to price/time priority. In this example, the stored parameters appear as follows:

| Bids | Offers |
|---|---|
| Order C: 400 @ 20.03, Hidden = Y ← | Away Market Center A 300 @ 20.00 |
| Order B: 600 @ 20.00, Hidden = Y ← | |
| Order A: 200 @ 19.99, Hidden = N ← | |
| Away Market Center A 800 @ 19.95 | |

In this example, at this point, the posting market center's best bid is 200 @ $19.99 and the posting market center has no offer on the book, due to Order X being fully executed. The posting market center's public book looks like this, in this example:

| Bids | Offers |
|---|---|
| Posting Market Center 200 @ 19.99 | |

Example 2

Hidden Market Center-Restricted Buy Orders Trade with Incoming Sell Orders on the Posting Market Center Although Orders B and C are hidden from the public order book, they will trade with incoming sell orders on the posting market center 20 whose prices are marketable (i.e. with prices not greater than the buy order prices) just as any regular non-hidden limit order would. Continuing from the previous example, the posting market center 20 receives the following incoming regular limit sell order:

Order Z: Sell 500 @ 20.00 (lower than Order C and equal to Order B)

As Order C has the highest priority, in this example, due to price/time priority rules, the process trades it first, matching 400 shares of incoming Order Z against Order C at Order C's price of $20.03. Order C is now fully depleted and removed from the internal order book. The process continues to Order B, and matches the remaining 100 shares of Order Z against Order B at Order B's price of $20.00. Order B still has 500 shares available to trade, so it remains hidden in the internal order book.

In this example, the stored parameters appear as follows after the trades:

| Bids | Offers |
|---|---|
| Order B: 500 @ 20.00, Hidden = Y ← | Away Market Center A 300 @ 20.00 |
| Order A: 200 @ 19.99, Hidden = N | |
| Away Market Center A 800 @ 19.95 | |

In this example, at this point, the posting market center's best bid is still 200 @ $19.99 and the posting market center has no offer on the book. The posting market center's public order book continues to look like this, in this example:

| Bids | Offers |
|---|---|
| Posting Market Center 200 @ 19.99 | |

Figure 3:
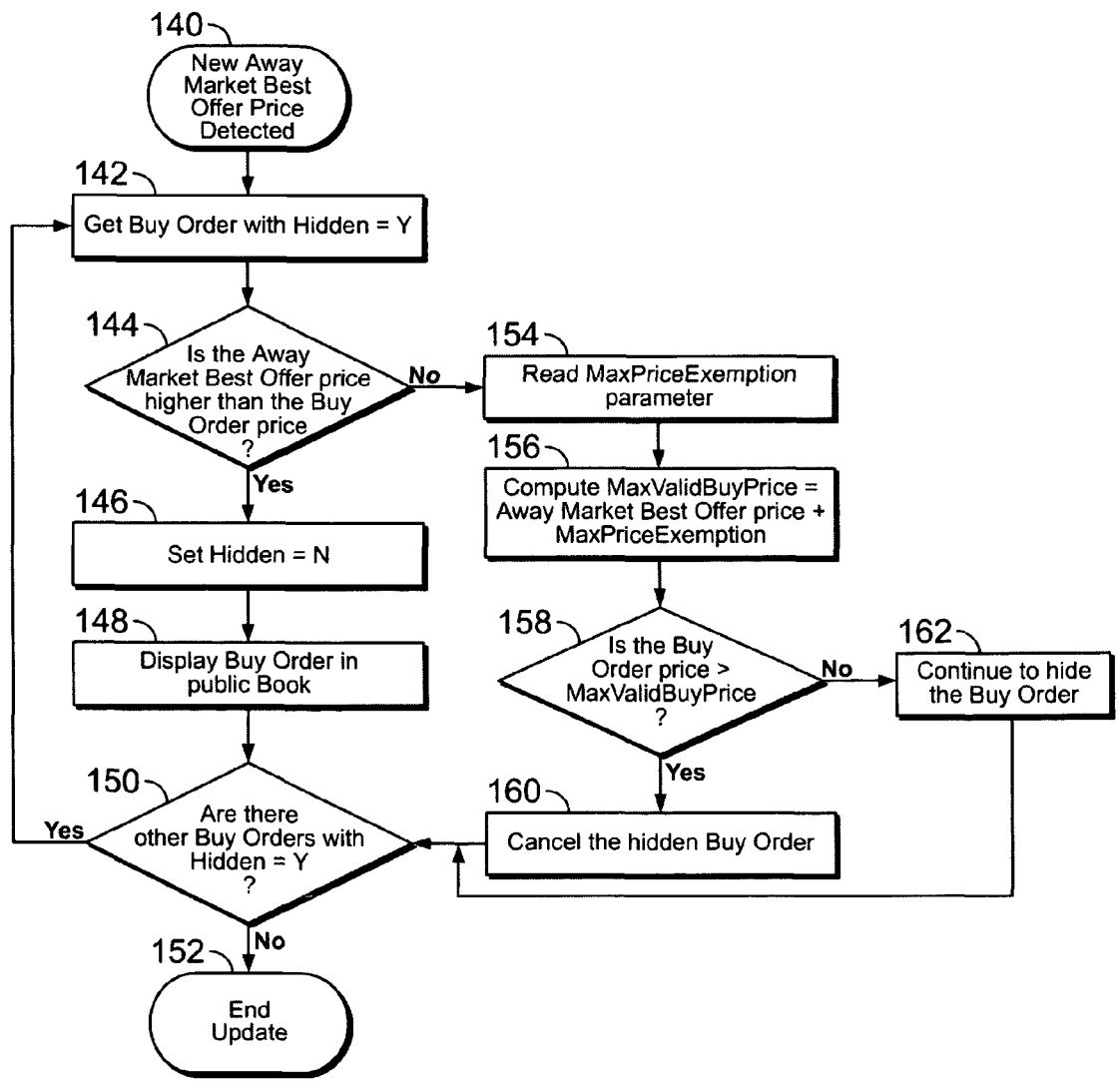
FIG. 3 is a flow diagram illustrating a process implemented by an embodiment of the present invention where market center-restricted buy orders are hidden on a posting market center.

Update of the Away Market Best Offer Price and Re-evaluation of Hidden Market Center-Restricted Buy Orders Referring back to Example 1, once the process has hidden a market center-restricted buy order, such as Orders B and C in Example 1 above, those orders must be checked and re-evaluated whenever the away market best offer price is updated. FIG. 3 illustrates the process implemented by the order maintenance program 22 where the away market best offer price is updated. The order matching engine 21 is continuously checking the best offer price for the entire market. At step 140, the order matching engine 21 detects a new away market best offer price and provides it to the order maintenance program 22. At step 142, the process implemented by the order maintenance program 22 retrieves a hidden restricted buy order that has a "Hidden" parameter equal to "Y". At step 144, the process checks if the new away market best offer price is higher than a hidden market center-restricted buy order's price. If it is, then, the process, at step 146, sets the Hidden parameter to "N", and this order is no longer hidden. At step 148, the process displays the previously hidden order on the posting market center's public order book according to normal price/time priority rules for limit orders. Once a market center-restricted buy order is posted, it will stand its ground to updates of the away market best offer price, even if an away market crosses or locks the newly displayed non-hidden order.

Referring back to step 144, if the updated away market best offer price is not higher than the hidden buy order price, then the process continues on to step 154 where the process reads the maximum price exemption parameter again. At step 156, the process computes an updated maximum valid buy order price, which is the updated away market best offer price plus the maximum price exemption parameter. At step 158, the process checks to see if the buy order price is greater than the maximum valid buy order price. If it is, then the hidden buy order is canceled, as indicated at step 160. If it is not, then the process continues to hide the buy order on the posting exchange's internal book, as indicated at step 162. After steps 148, 160 and 162, the process proceeds to step 150 and checks if there are any further buy orders that are hidden from display (i.e. Hidden="Y"). If there are, then the process goes back to step 142 and analyzes this order in the same manner it analyzed the previous buy order, as described above. The process continues in this manner until there are no further buy orders with a Hidden parameter set to "Y" to update, at which point the update is complete as indicated at step 152.

Examples of situations where the away market best offer price has been updated are provided below. It should be understood that the order prices and market prices discussed in these examples are by way of example only to illustrate how the process of an embodiment of the invention handles updating a hidden market center-restricted buy order.

Example 3

Update of the Away Market Best Offer Price and Re-Evaluation of Hidden Market center-restricted buy orders (away market best offer price moves lower; Displayed Restricted Buy Order Stands its Ground)

In this Example 3, following through from Example 1, the away market best offer price has moved lower and has changed from $20 to $19.99. Away Market Center A is now quoting 800 @ $19.95 to 300 @ $19.99. Carrying through from Example 1 above, the posting market center internal book now appears as follows:

| Bids | Offers |
|---|---|
| Order C: 400 @ 20.03, Hidden = Y ← | Away Market Center A 300 @ 19.99 |
| Order B: 600 @ 20.00, Hidden = Y ← | |
| Order A: 200 @19.99, Hidden = N ← | |
| Away Market Center A 800 @ 19.95 | |

Orders B and C, since their Hidden parameters are set to "Y", are processed in accordance with the process of FIG. 3 in light of the updated away market best offer price. Due to the similarity of processing in this example, Orders B and C are discussed together, but it should be understood that according to the price/time priority rules in effect that Order C is actually processed first. At step 144, the process checks to see if the updated away market best offer price is higher than the order's buy price. In this example, the updated away market best offer price is not higher than Order B and C's buy price. In fact, the updated away market best offer price has moved even lower in relation to the buy prices of Orders B and C ($19.99 vs. $20.00 and $20.03). The process continues on to steps 154 and 156 where the process computes an updated maximum valid buy order price. In this example, the updated maximum valid buy order price is $20.02 ($19.99+$0.03). At step 158, the process checks whether Order B's and C's prices are greater than the updated maximum valid buy order price. In this example, Order B's price is not greater than the maximum valid buy order price (Order B=$20<MaxValidBuyPrice=$20.02). So, the process continues to hide Order B, as indicated at step 162. In this example, Order C is greater than the maximum valid buy order price (Order C=$20.03>MaxValidBuyPrice=$20.02). So, in this example, Order C is canceled at this point, as indicated at step 160. It should be noted that even though Order C is canceled in this embodiment, in other embodiments, Order C could be moved to a separate holding area where it would be held until the away market best offer price moved higher allowing Order C to be re-posted on the internal book at that time.

As for Order A, since it was previously displayed on the public order book, it stands its ground even though the away market now locks it. In this embodiment, a previously displayed order, like Order A, will not be hidden after it has already been displayed to the public book.

After updating the away market best offer price and processing Orders A, B and C in this example, the posting market center posts them to its internal book according to price/time priority. In this example, the updated internal order book appears as follows:

| Bids | Offers |
|---|---|
| Order B: 600 @ 20.00, Hidden = Y ← | Away Market Center A 300 @ 19.99 |
| Order A: 200 @ 19.99, Hidden = N ← | |
| Away Market Center A 800 @ 19.95 | |

Example 4

Update of the Away Market Best Offer Price and Re-Evaluation of Hidden Market Center-Restricted Buy Orders (Away Market Best Offer Price Moves Higher)

In this Example 4, following through from Example 1, the away market best offer price has moved higher and has changed from $20 to $20.02. Away Market Center A is now quoting 800 @ $19.95 to 300 @ $20.02. Carrying through from Example 1 above, the posting market center internal book now appears as follows:

| Bids | Offers |
|---|---|
| Order C: 400 @ 20.03, Hidden = Y ← | Away Market Center A 300 @ 20.02 |
| Order B: 600 @ 20.00, Hidden = Y ← | |
| Order A: 200 @ 19.99, Hidden = N ← | |
| Away Market Center A 800 @ 19.95 | |

Orders B and C, since their Hidden parameters are set to "Y", are processed in accordance with the process of FIG. 3 in light of the updated market best offer price. At step 140, the updated away market best offer price of $20.02 is detected. At step 142, hidden Order C is retrieved. Order C is retrieved first because it has a higher price than Order B. At step 144, the process checks to see if the updated market best offer price is higher than Order C's buy price. In this example, the updated away market best offer price ($20.02) is not higher than Order C's buy price ($20.03). The process continues on to steps 154 and 156 where the process computes the updated maximum valid buy order price, which in this example, is $20.05 ($20.02+$0.03). At step 158, the process checks whether Order C's price is greater than the updated maximum valid buy order price. In this example, Order C's price is not greater than the maximum valid buy order price (Order C=$20.03<MaxValidBuyPrice=$20.05). So, the process continues to hide Order C, as indicated at step 162.

At step 150, the process determines if there are other orders with the Hidden parameter set to "Y". In this case, there is. Order B also has a Hidden parameter set to "Y". The process proceeds to analyze hidden Order B, returning to step 142 to start the analysis. At step 144, the process checks to see if the updated away market best offer price ($20.02) is higher than Order B's buy price. In this example, the updated away market best offer price is higher than Order B's buy price. Therefore, for Order B, at step 146, the process sets the Hidden parameter to "N" and, then, at step 148, Order B is inserted into the posting market center's public order book and displayed on both the internal and public order books. In this example, there are no further hidden orders with the Hidden parameter set to "Y". Therefore, as indicated at 152, the update process ends.

The posting market center's internal book now appears as follows:

| Bids | Offers |
| --- | --- |
| Order C: 400 @ 20.03, Hidden = Y ← | Away Market Center A 300 @ 20.02 |
| Order B: 600 @ 20.00, Hidden = N ← | |
| Order A: 200 @ 19.99, Hidden = N ← | |
| Away Market center A 800 @ 19.95 | |

In this example, the posting market center's best bid at this point is 600 @ $20 and the posting market center has no offer on the book. The posting market center's public book looks like this, in this example:

| Bids | Offers |
| --- | --- |
| Posting Market center 600 @ 20 | |
| Posting Market center 200 @ 19.99 | |

Incoming Market Center-Restricted Sell Order

Figure 4:
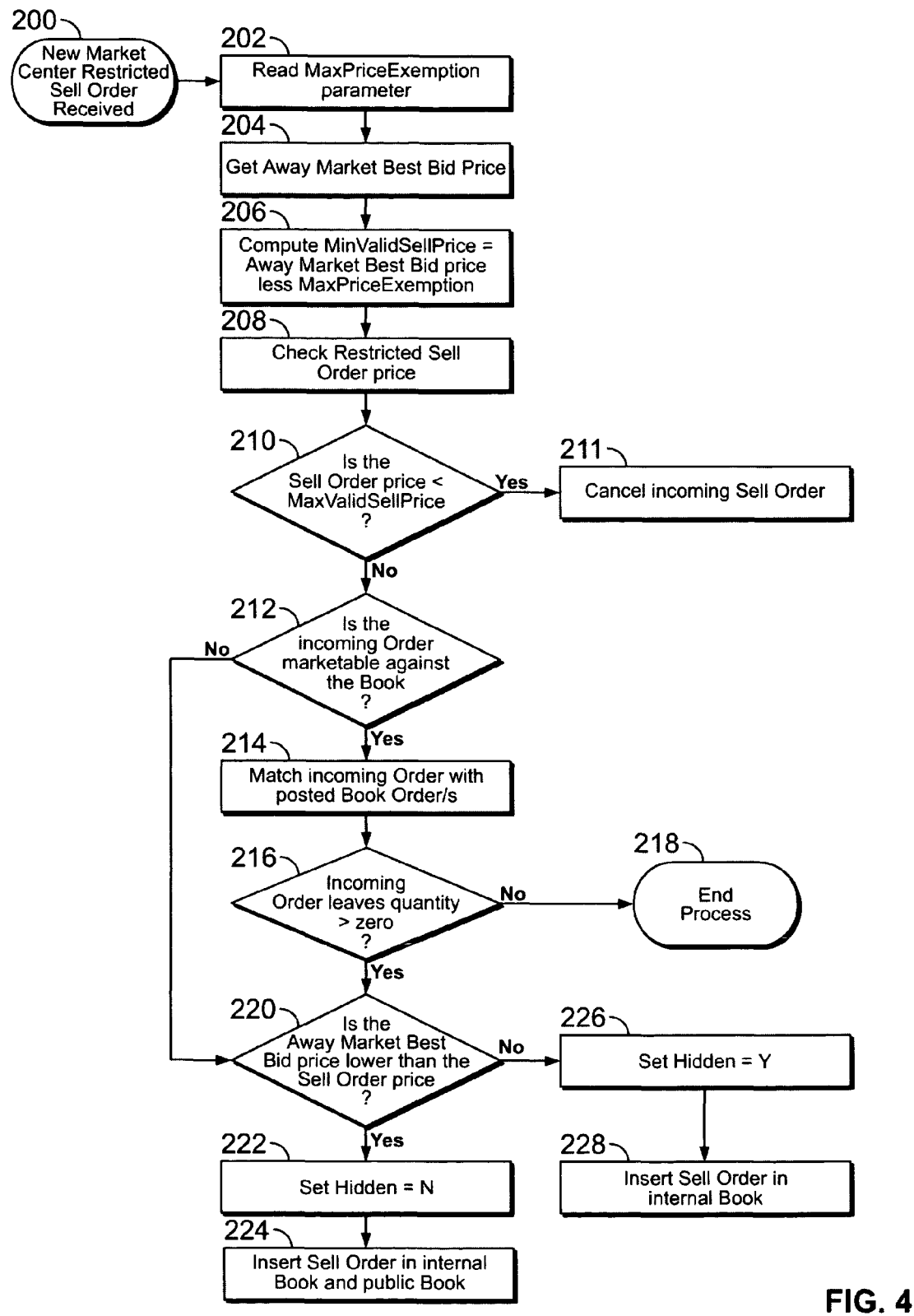
FIG. 4 is a flow diagram illustrating a process implemented by an embodiment of the present invention for incoming market center-restricted sell orders.

FIG. 4 illustrates the process implemented by the order maintenance program 22 where a trader 26 sends a sell order to the posting market center 20 with instructions that the sell order only be executed on the posting market center 20 (i.e. a market center-restricted sell order) and the away market is at the Market Best Bid price. At step 200, a new market center-restricted sell order is received by the order matching engine 21, and the order matching engine 21, recognizing the market center restriction, initiates the order maintenance program 22. At step 202, the process reads the maximum price exemption parameter (e.g. "MaxPriceExemption") from the order and trade parameters data structure 27. At step 204, the process gets the away market best bid price from the data structure 25. At step 206, the process computes the minimum price that the incoming sell order can be at to be a valid exempt order ("MinValidSellPrice"). When the away market is the Market Best Bid, the minimum price that a market center-restricted sell order can be at and still be valid is equal to the away market best bid price minus the maximum price exemption. For example, if the away market best bid price is $19.95 and the maximum price exemption is 3¢, then the minimum valid sell price for a market center-restricted sell order is $19.92. In this example, any market center-restricted sell order below $19.92 would be invalid and would be canceled. At step 208, the process checks the price of the market center-restricted sell order.

At step 210, the process checks to see if the price of the market center-restricted sell order is less than the computed minimum valid sell order price parameter. If the sell order price is less than the minimum valid sell order price parameter, then the order is canceled, as indicated at step 211. If the sell order price is greater than or equal to (not less than) the minimum valid sell order price parameter, then the order proceeds to step 212 where its marketability against the posting market center's book is assessed. At step 212, the process checks to see if the sell order is marketable. If the sell order is marketable, the process proceeds to step 214 where the order matching engine 21 trades the new sell order against standing orders posted in the posting market center's order book according to the market center's trading rules. Then, at step 216, the process checks to see if the sell order still has any quantity remaining on the order to be traded. If the sell order does not, then the order is complete, and the process ends with respect to this order, as indicated at 218. If the order is not complete and still has quantity remaining to be traded, the process proceeds to step 220. Referring back to step 212, if the incoming sell order is not marketable, the process proceeds to step 220 at this point as well.

At step 220, the away market best bid price is compared to the restricted sell order price to see if the away market best bid price is lower than the restricted sell order price. If the away market best bid price is lower than the restricted sell order price, then the sell order will not lock or cross the away market. In this instance, the program proceeds to step 222 where a parameter, in this example named Hidden, is set to "N". Setting Hidden equal to "N" means that the program 22 displays the sell order on the posting market center 20 because the sell order does not lock or cross the away market. Then at step 224, the market center-restricted sell order is inserted and displayed on the posting market center's internal and public order book according to normal price/time priority rules for limit orders.

Referring back to step 220, if the process determines that the away market best bid price is not lower than the restricted sell order price (i.e. the away market best bid price is equal to or greater than the restricted sell order price), then this sell order would lock or cross the market if it was displayed on the posting market center's public order book. The process, at this point, then acts to protect the away market centers 24 while not canceling the order, as would have been done with prior systems. At step 226, the process sets the Hidden parameter to "Y" so the system knows for later checks that the order price has been hidden. At step 228, the order is inserted into the posting market center's internal order book according to the price/time priority rules. The restricted sell order, in this example, is not posted to nor displayed on the public order book at this point. It is hidden from the public market.

Example 5

Incoming Market Center-Restricted Sell Order
(Away Market Center at Best Bid Price with 3¢ Price Exemption in Effect)

An example of a new restricted sell order posted to a posting market center 20 is provided below. It should be understood that the order prices and market prices discussed in this example are by way of example only to illustrate how the process of an embodiment of the invention handles a market center-restricted sell order.

In this example, the Market Best Bid is $19.95 and the Market Best Offer is $20. An Away Market Center A is quoting 300 @ $19.95 to 800 @ $20. The posting market center 20 has a limit sell order for 300 @ $19.94 in the market. A 3¢ price exemption rule is in effect for the market discussed in this example for this security. The posting market center internal book in this example appears as follows:

| Bids | Offers |
|---|---|
| Away Market Center A 300 @ 19.95 | Away Market Center A 800 @ 20.00 |
| Order Y 300 @ 19.94 | |

The posting market center 20 receives the four incoming market center-restricted sell orders stated below in the following sequence and processes each order in accordance with the process of FIG. 4.

Order E: Sell 200 @ $19.96 (higher than the Market Best Bid price)
Order F: Sell 600 @ $19.95 (same as the Market Best Bid price)
Order G: Buy 700 @ $19.92 (lower than the Market Best Bid price)
Order H: Buy 300 @ $19.91 (lower than the Market Best Bid price)

Order E:

For Order E, the market center receives Order E at step 200. At step 202, the process reads the maximum price exemption parameter (MaxPriceExemption), which in this example is 3¢. Then, at step 204, the process gets the away market best bid price from the data structure 25, which in this example is $19.95. At step 206, the process computes the minimum price that Order E can be at to be a valid exempt order ("MinValidSellPrice"). In this example, the minimum valid sell price for a sell order is $19.92 (i.e. the away market best bid price of $19.95 minus the maximum price exemption of 3¢). At step 208, the process checks the price of Order E, which in this case is $19.96.

At step 210, the process checks to see if the price of Order E ($19.96) is less than the computed minimum valid sell order price parameter ($19.92). In this case, Order E's price is not less; so, the process proceeds to step 212 where Order E's marketability against the posting market center's book is assessed. In this case, Order E is not marketable because Order E is priced at $19.96, and this is higher than any bids presently in the market. Accordingly, the process proceeds to step 220. At step 220, the process compares the away market best bid price to Order E's price. In this case, the away market best bid price ($19.95) is lower than Order E's restricted sell order price ($19.96), so the process continues on to step 222, setting the Hidden parameter to "N" since Order E's price does not need to be hidden. At step 224, Order E is inserted into the posting market center's internal and public order book and is displayed as an order to sell at $19.96.

Order F:

For Order F, the market center receives Order F at step 200. At step 202, the process again reads the maximum price exemption parameter (MaxPriceExemption), which in this example is 3¢. Then, as before, at step 204, the process gets the away market best bid price, which in this example is $19.95 again. At step 206, the process computes the minimum price that Order F can be at to be a valid exempt order ("MinValidSellPrice"). In this example, the minimum valid sell price for a sell order is $19.92 (i.e. the away market best bid price of $19.95 minus the maximum price exemption of 30). At step 208, the process checks the price of Order F, which in this case is $19.95.

At step 210, the process checks to see if the price of Order F ($19.95) is less than the computed minimum valid sell order price parameter ($19.92). In this case, as with Order E, Order F's price is not less; so, the process proceeds to step 212 where Order F's marketability against the posting market center's book is assessed. As with Order E, Order F is not marketable. Even though Order F is priced at $19.95 and there is a bid in the market at $19.95, Order F is a restricted sell order and, as such, cannot execute against the bid at $19.95 on Away Market Center A. Accordingly, the process proceeds to step 220. At step 220, the process compares the away market best bid price to the restricted sell order price. In this case, the away market best bid price ($19.95) is equal to Order F's restricted sell order price ($19.95), so the process continues on to step 226, setting the Hidden parameter to "Y" since Order F's price needs to be hidden from the public market. At step 228, Order F is inserted into the posting market center's internal order book and hidden from the public order book. It should be noted that although Order F is hidden from the public order book, it will trade with incoming buy orders on the posting market center 20 priced at $19.95 or higher according to the posting exchange's normal price/time priority rules for matching orders in the internal order book.

Order G:

For Order G, the market center receives Order G at step 200. As with Orders E and F, the process proceeds through steps 202 to 206 to determine that the minimum valid sell price for a sell order is $19.92. At step 208, the process checks the price of Order G, which in this case is $19.92. At step 210, the process checks to see if the price of Order G ($19.92) is less than the computed minimum valid sell order price parameter ($19.92). In this case, as with Orders E and F, Order G's price is not less; so, the process proceeds to step 212 where Order G's marketability against the posting market center's book is assessed. In this example, Order G is marketable. Order G is priced at $19.92, and the best posting market center bid price is $19.94 (Order Y). So, Order G can execute, at least partially, against Order Y. Away Market Center A still has the Market Best Bid price at $19.95. However, in this example, because a 3¢ price exemption is in effect, the posting market center 20 can trade down to 3¢ below Away Market Center A's better price, which in this example means the posting exchange can execute trades down to $19.92. As such, in this example, at step 214, 300 shares of Order G trade against the 300 shares of Order Y at Order Y's price of $19.94. At step 216, the process checks to see if Order G has any quantity remaining. In this instance, Order G does. It has 400 shares remaining. Accordingly, the process proceeds to step 220. At step 220, the process compares the away market best bid price to Order G's price. In this instance, the away market best bid price ($19.95) is higher than Order G's restricted sell order price ($19.92), so the process continues on to step 226, setting the Hidden parameter to "Y" for the remainder of Order G since Order G's price needs to be hidden from the public market. At step 228, Order G is inserted into the posting market center's internal order book and hidden from the public order book. It should be noted that, as with Order F, although Order G is hidden from the public order book, it will trade with incoming buy orders on the posting market center 20 priced at $19.92 or higher according to the posting exchange's normal price/time priority rules for matching orders in the internal order book.

Order H:

For Order H, as with Orders E, F and G, the process proceeds through steps 200 to 206 to determine that the minimum valid sell price for a sell order is $19.92. At step 208, the process checks the price of Order H, which in this case is $19.91. At step 210, the process checks to see if the price of Order H ($19.91) is less than the computed minimum valid sell order price parameter ($19.92). In this case, Order H's price is less than the computed minimum valid sell order price parameter ($19.91<$19.92); so, the process proceeds to step 211 where Order H is canceled. It should be noted that even though Order H is canceled in this embodiment, in other embodiments, Order H could be moved to a separate holding area where it would be held until the away market best bid price moved lower allowing Order H to be posted on the internal book at that time.

After processing Orders E, F, G and H in this example, the posting market center posts the remaining orders to its internal book according to price/time priority. In this example, the stored parameters appear as follows:

| Bids | Offers |
| --- | --- |
| Away Market Center A 300 @ 19.95 | Order G: 400 @ 19.92, Hidden = Y ← |
| | Order F: 600 @ 19.95, Hidden = Y ← |
| | Order E: 200 @ 19.96, Hidden = N ← |
| | Away Market Center A 800 @ 20.00 |

In this example, at this point, the posting market center's best offer is 200 @ $19.96 and the posting market center has no bid on the book, due to Order Y being fully executed. The posting market center's public book looks like this, in this example:

| Bids | Offers |
| --- | --- |
| | Posting Market Center 200 @ 19.96 |

Example 6

Hidden Market Center-Restricted Sell Orders Trade with Incoming Buy Orders on the Posting Market Center Although Orders F and G are hidden from the public order book, they will trade with incoming buy orders on the posting market center 20 whose prices are marketable (i.e. with prices not less than the sell order prices) just as any regular non-hidden limit order would. Continuing from the previous example, the posting market center 20 receives the following incoming regular limit buy order:

Order W: Buy 500 @ 19.95 (higher than Order G and equal to Order F)

As Order G has the highest priority, in this example, due to price/time priority rules, the process trades it first, matching 400 shares of incoming Order W against Order G at Order G's price of $19.92. Order G is now fully depleted and removed from the internal order book. The process continues to Order F, and matches the remaining 100 shares of Order W against Order F at Order F's price of $19.95. Order F still has 500 shares available to trade, so it remains hidden in the internal order book.

In this example, the stored parameters appear as follows after the trades:

| Bids | Offers |
| --- | --- |
| Away Market Center A 300 @ 19.95 | Order F: 500 @ 19.95, Hidden = Y ← |
| | Order E: 200 @ 19.96, Hidden = N ← |
| | Away Market Center A 800 @ 20.00 |

In this example, at this point, the posting market center's best offer is still 200 @ $19.96 and the posting market center has no bid on the book. The posting market center's public book continues to look like this, in this example:

| Bids | Offers |
| --- | --- |
| | Posting Market Center 200 @ 19.96 |

Figure 5:
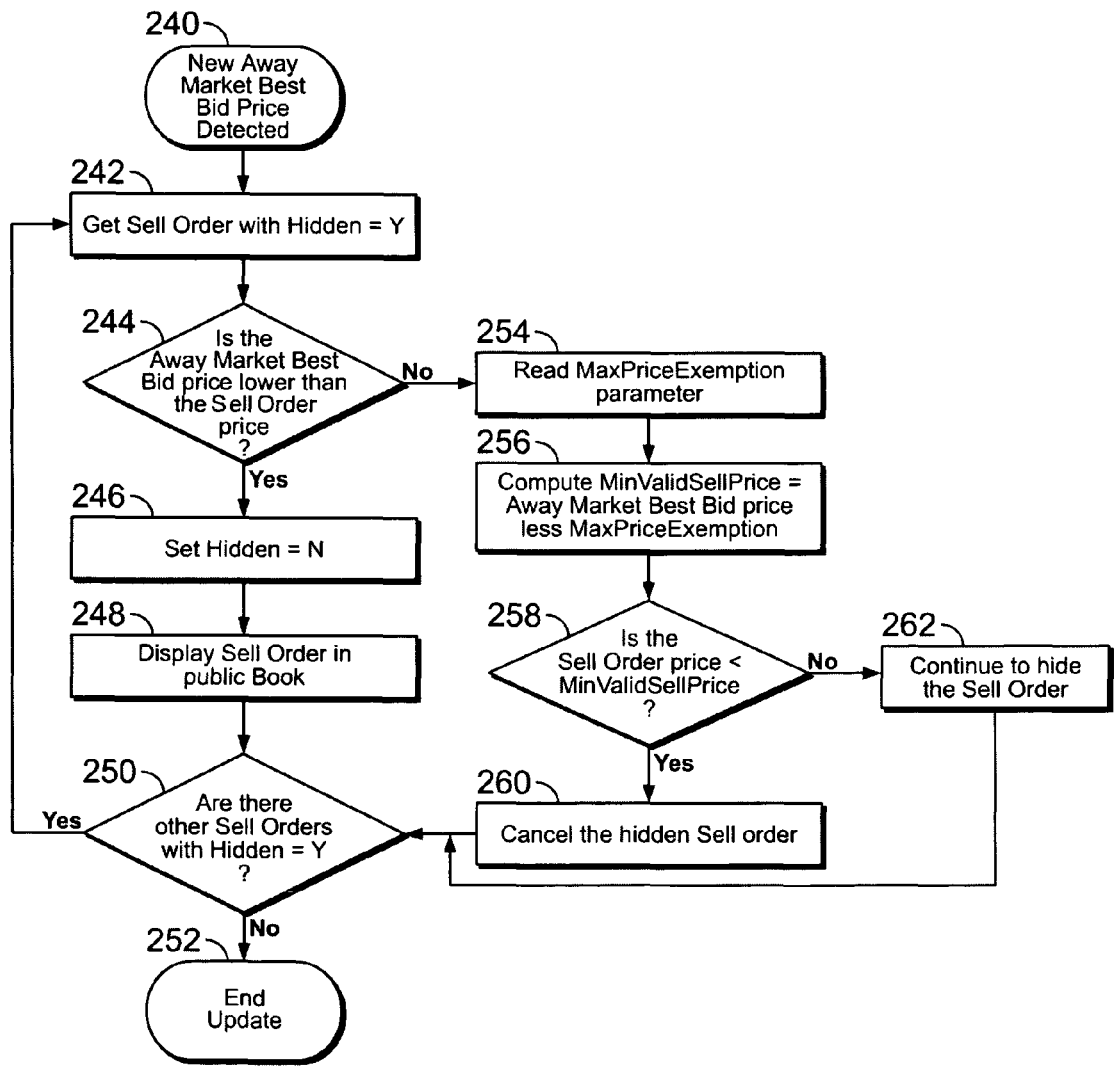
FIG. 5 is a flow diagram illustrating a process implemented by an embodiment of the present invention where market center-restricted sell orders are hidden on a posting market center.

Update of the Market Best Bid Price and Re-Evaluation of Hidden Market Center-Restricted Sell Orders Referring back to Example 5, once the process has hidden a market center-restricted sell order, such as Orders F and G in Example 1 above, those orders must be checked and re-evaluated whenever the away market best bid price is updated. FIG. 5 illustrates the process implemented by the order maintenance program 22 where the away market best bid price is updated. The order matching engine 21 is continuously checking the best bid price for the entire market. At step 240, the order matching engine 21 detects a new away market best bid price and provides it to the order maintenance program 22. At step 242, the process implemented by the order maintenance program 22 retrieves a hidden restricted sell order that has a "Hidden" parameter equal to "Y". At step 244, the process checks if the new away market best bid price is lower than a hidden market center-restricted sell order's price. If it is, then, the process, at step 246, sets the Hidden parameter to "N", and this order is no longer hidden. At step

248, the process inserts the previously hidden order into the public order book and displays it on the posting market center's internal and public order book according to normal price/time priority rules for limit orders. Once a market center-restricted sell order is posted, it will stand its ground to updates of the away market best bid price, even if an away market crosses or locks the newly displayed non-hidden order.

Referring back to step 244, if the updated away market best bid price is not lower than the hidden sell order price, then the process continues on to step 254 where the process reads the maximum price exemption parameter again. At step 256, the process computes an updated minimum valid sell order price, which is the updated away market best bid price minus the maximum price exemption parameter. At step 258, the process checks to see if the sell order price is less than the minimum valid sell order price. If it is, then the hidden sell order is canceled, as indicated at step 260. If it is not, then the process continues to hide the sell order on the posting exchange's internal book, as indicated at step 262. After steps 248, 260 and 262, the process proceeds to step 250 and checks if there are any further sell orders that are hidden from display (i.e. Hidden="Y"). If there are, then the process goes back to step 242 and analyzes this order in the same manner it analyzed the previous sell order, as described above. The process continues in this manner until there are no further sell orders with a Hidden parameter set to "Y" to update, at which point the update is complete as indicated at step 252.

Examples of situations where the away market best bid price has been updated are provided below. It should be understood that the order prices and market prices discussed in these examples are by way of example only to illustrate how the process of an embodiment of the invention handles updating a hidden market center-restricted sell order.

Example 7

Update of the Away Market Best Bid Price and Re-Evaluation of Hidden Market Center-Restricted Sell Orders (Away Market Best Bid Price Moves Higher; Displayed Restricted Sell Order Stands its Ground)

In this Example 7, following through from Example 5, the away market best bid price has moved higher and has changed from $19.95 to $19.96. Away Market Center A is now quoting 300 @ $19.96 to 800 @ $20. Carrying through from Example 1 below, the posting market center internal book now appears as follows:

| Bids | Offers |
| --- | --- |
| Away Market Center A 300 @ 19.96 | Order G: 400 @ 19.92, Hidden = Y ← Order F: 600 @ 19.95, Hidden = Y ← Order E: 200 @ 19.96, Hidden = N ← Away Market Center A 800 @ 20.00 |

Orders F and G, since their Hidden parameters are set to "Y", are processed in accordance with the process of FIG. 5 in light of the updated away market best bid price. Due to the similarity of processing in this example, Orders F and G are discussed together, but it should be understood that according to the price/time priority rules in effect that Order G is actually processed first. At step 244, the process checks to see if the updated away market best bid price is lower than the order's sell price. In this example, the updated away market best bid price is not lower than Order F and G's sell price. In fact, the updated away market best bid price has moved even higher in relation to the sell prices of Orders F and G ($19.96 vs. $19.95 and $19.92). The process continues on to steps 254 and 256 where the process computes an updated minimum valid sell order price. In this example, the updated minimum valid sell order price is $19.93 ($19.96-$0.03). At step 258, the process checks whether Order F's and G's prices are less than the updated minimum valid sell order price. In this example, Order F's price is not less than the minimum valid sell order price (Order F=$19.95>MinValidSellPrice=$19.93). So, the process continues to hide Order F, as indicated at step 262. In this example, Order G is less than the minimum valid sell order price (Order G=$19.92<MinValidSellPrice=$19.93). So, in this example, Order G is canceled at this point, as indicated at step 260. It should be noted that even though Order G is canceled in this embodiment, in other embodiments, Order G could be moved to a separate holding area where it would be held until the away market best bid price moved lower allowing Order G to be re-posted on the internal book at that time.

As for Order E, since it was previously displayed on the public order book, it stands its ground even though the away market now locks it. In this embodiment, a previously displayed order, like Order E, will not be hidden after it has already been displayed to the public book.

After updating the away market best bid price and processing Orders E, F and G in this example, the posting market center posts them to its internal book according to price/time priority. In this example, the updated internal order book appears as follows:

| Bids | Offers |
| --- | --- |
| Away Market Center A 300 @ 19.96 | Order F: 600 @ 19.95, Hidden = Y ← Order E: 200 @ 19.96, Hidden = N ← Away Market Center A 800 @ 20.00 |

Example 8

Update of the Away Market Best Bid Price and Re-Evaluation of Hidden Market Center-Restricted Sell Orders (Away Market Best Bid Price Moves Lower)

In this Example 8, following through from Example 5, the away market best bid price has moved lower and has changed from $19.95 to $19.93. Away Market Center A is now quoting 300 @ $19.93 to 800 @ $20. Carrying through from Example 5 above, the posting market center internal book now appears as follows:

| Bids | Offers |
| --- | --- |
| Away Market Center A 300 @ 19.93 | Order G: 400 @ 19.92, Hidden = Y ← Order F: 600 @ 19.95, Hidden = Y ← Order E: 200 @ 19.96, Hidden = N ← Away Market Center A 800 @ 20.00 |

Orders F and G, since their Hidden parameters are set to "Y", are processed in accordance with the process of FIG. 5 in light of the updated market best bid price. At step 240, the updated away market best bid price of $19.93 is detected. At step 242, hidden Order G is retrieved. Order G is retrieved first because it has a lower price than Order F. At step 244, the process checks to see if the updated away market best bid price is lower than Order G's sell price. In this example, the updated away market best bid price ($19.93) is not lower than Order G's sell price ($19.92). The process continues on to steps 254 and 256 where the process computes the updated minimum valid sell order price, which in this example, is $19.90 ($19.93-$0.03). At step 258, the process checks whether Order G's price is less than the updated minimum valid sell order price. In this example, Order G's price is not less than the minimum valid sell order price (Order G=$19.92>MinValidSellPrice=$19.90). So, the process continues to hide Order G, as indicated at step 262.

At step 250, the process determines if there are other orders with the Hidden parameter set to "Y". In this case, there is. Order F also has a Hidden parameter set to "Y". The process proceeds to analyze hidden Order F, returning to step 242 to start the analysis. At step 244, the process checks to see if the updated away market best bid price ($19.93) is lower than Order F's sell price. In this example, the updated away market best bid price is lower than Order F's sell price. Therefore, for Order F, at step 246, the process sets the Hidden parameter to "N" and, then, at step 248, Order F is inserted into the posting market center's public order book and displayed on both the internal and public order books. In this example, there are no further hidden orders with the Hidden parameter set to "Y". Therefore, as indicated at 252, the update process ends.

The posting market center's internal book now appears as follows:

| Bids | Offers |
|---|---|
| Away Market Center A 300 @ 19.93 | Order G: 400 @ 19.92, Hidden = Y ← |
| | Order F: 600 @ 19.95, Hidden = N ← |
| | Order E: 200 @ 19.96, Hidden = N ← |
| | Away Market Center A 800 @ 20.00 |

In this example, the posting market center's best offer at this point is 600 @ $19.95 and the posting market center has no bid on the book. The posting market center's public book looks like this, in this example:

| Bids | Offers |
|---|---|
| | Posting Market Center 600 @ 19.95 |
| | Posting Market Center 200 @ 19.96 |

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A method implemented at least partially in a computing system, the method comprising:

providing an electronic posting market center having an internal order book, a public order book, and a maximum price exemption parameter, wherein the maximum price exemption parameter is the price difference between a price at a better-priced market center and a price the electronic posting market center is allowed to trade a financial instrument;

receiving by the computing system a market center-restricted buy order specifying the financial instrument, a price, and that it will only execute on the electronic posting market center;

retrieving by the computing system a best away market offer price in the specified financial instrument, wherein the best away market offer price is the lowest offer price for the specified financial instrument on one or more away market centers;

computing by the computing system a maximum valid buy order price by adding the maximum price exemption to the best away market offer price;

determining by the computing system whether the market center-restricted buy order is a valid buy order by comparing the price of the market center-restricted buy order to the maximum valid buy order price, wherein the market center-restricted buy order is a valid buy order if its price is less than or equal to the maximum valid buy order price;

responsive to determining that the market center-restricted buy order is a valid buy order, determining by the computing system whether the away market best offer price is higher than the price of the market center-restricted buy order; and responsive to determining that the away market best offer price is not higher than the price of the market restricted buy order:

inserting by the computing system the market center-restricted buy order into the electronic posting market center internal order book as a hidden market center-restricted buy order which is not displayed on the posting market center public order book;

receiving by the computing system an updated away market best offer price, wherein the updated away market best offer price has moved higher;

retrieving by the computing system a hidden market center-restricted buy order;

determining by the computing system whether the updated away market best offer price is higher than the price of the hidden market center-restricted buy order; and responsive to determining that the updated away market best offer price is not higher than the price of the hidden market center-restricted buy order:

retrieving by the computing system the maximum price exemption;

computing by the computing system an updated maximum valid buy order price based on the maximum price exemption and the updated best away market offer price;

determining by the computing system whether the hidden market center-restricted buy order is valid; and responsive to determining that the hidden market center-restricted buy order is valid, continuing by the computing system to list the market center-restricted buy order on the posting market center internal order book as a hidden market center-restricted buy order and continuing to not display the hidden market center-restricted buy order on the posting market center public order book.

2. The method of claim 1, further comprising, responsive to determining that the away market best offer price is higher than the price of the market center-restricted buy order:
- inserting by the computing system the market center-restricted buy order into the electronic posting market center internal order book; and
- displaying by the computing system the market center-restricted buy order on the electronic posting market center public order book.

3. The method of claim 1, further comprising:
- receiving by the computing system a sell order on the internal book;
- determining by the computing system the marketability of the hidden market center-restricted buy order; and
- trading by the computing system the hidden market center-restricted buy order against the sell order, if the hidden market center-restricted buy order is marketable.

4. The method of claim 1, wherein the maximum price exemption is 3¢.

5. The method of claim 1, wherein the maximum price exemption is 5¢.

6. The method of claim 1, wherein the maximum price exemption is 0.

7. The method of claim 1, wherein the computing system is one or more programmed computers.

8. The method of claim 1, wherein the computing system is distributed over several physical locations.

9. A method implemented at least partially in a computing system, the method comprising:
- providing an electronic posting market center having an internal order book, a public order book, and a maximum price exemption parameter, wherein the maximum price exemption parameter is the price difference between a price at a better-priced market center and a price the electronic posting market center is allowed to trade a financial instrument;
- receiving by the computing system a market center-restricted buy order specifying the financial instrument, a price, and that it will only execute on the electronic posting market center;
- retrieving by the computing system a best away market offer price in the specified financial instrument, wherein the best away market offer price is the lowest offer price for the specified financial instrument on one or more away market centers;
- computing by the computing system a maximum valid buy order price by adding the maximum price exemption to the best away market offer price;
- determining by the computing system whether the market center-restricted buy order is a valid buy order by comparing the price of the market center-restricted buy order to the maximum valid buy order price, wherein the market center-restricted buy order is a valid buy order if its price is less than or equal to the maximum valid buy order price;
- responsive to determining that the market center-restricted buy order is a valid buy order, determining by the computing system whether the away market best offer price is higher than the price of the market center-restricted buy order; and
- responsive to determining that the away market best offer price is not higher than the price of the market restricted buy order:
  - inserting by the computing system the market center-restricted buy order into the electronic posting market center internal order book as a hidden market center-restricted buy order which is not displayed on the electronic posting market center public order book;
  - receiving by the computing system an updated away market best offer price, wherein the updated away market best offer price has moved higher;
  - retrieving by the computing system a hidden market center-restricted buy order;
  - determining by the computing system whether the updated away market best offer price is higher than the price of the hidden market center-restricted buy order; and
  - responsive to determining that the updated away market best offer price is not higher than the price of the hidden market center-restricted buy order:
    - retrieving by the computing system the maximum price exemption;
    - computing by the computing system an updated maximum valid buy order price based on the maximum price exemption and the updated best away market offer price;
    - determining by the computing system whether the hidden market center-restricted buy order is invalid; and
    - responsive to determining that the hidden market center-restricted buy order is invalid, cancelling by the computing system the market center-restricted buy order.

10. The method of claim 9, further comprising, responsive to determining that the away market best offer price is higher than the price of the market center-restricted buy order:
- inserting by the computing system the market center-restricted buy order into the electronic posting market center internal order book; and
- displaying by the computing system the market center-restricted buy order on the electronic posting market center public order book.

11. The method of claim 9, further comprising:
- receiving by the computing system a sell order on the internal book;
- determining by the computing system the marketability of the hidden market center-restricted buy order; and
- trading by the computing system the hidden market center-restricted buy order against the sell order, if the hidden market center-restricted buy order is marketable.

12. The method of claim 9, wherein the maximum price exemption is 3¢.

13. The method of claim 9, wherein the maximum price exemption is 5¢.

14. The method of claim 9, wherein the maximum price exemption is 0.

15. The method of claim 9, wherein the computing system is one or more programmed computers.

16. The method of claim 9, wherein the computing system is distributed over several physical locations.

17. A method implemented at least partially in a computing system, the method comprising:
- providing an electronic posting market center having an internal order book, a public order book, and a maximum price exemption parameter, wherein the maximum price exemption parameter is the price difference between a price at a better-priced market center and a price the electronic posting market center is allowed to trade a financial instrument;

receiving by the computing system a market center-restricted buy order specifying the financial instrument, a price, and that it will only execute on the electronic posting market center;

retrieving by the computing system a best away market offer price in the specified financial instrument, wherein the best away market offer price is the lowest offer price for the specified financial instrument on one or more away market centers;

computing by the computing system a maximum valid buy order price by adding the maximum price exemption to the best away market offer price;

determining by the computing system whether the market center-restricted buy order is a valid buy order by comparing the price of the market center-restricted buy order to the maximum valid buy order price, wherein the market center-restricted buy order is a valid buy order if its price is less than or equal to the maximum valid buy order price;

responsive to determining that the market center-restricted buy order is a valid buy order, determining by the computing system whether the away market best offer price is higher than the price of the market center-restricted buy order; and responsive to determining that the away market best offer price is not higher than the price of the market restricted buy order:

inserting by the computing system the market center-restricted buy order into the electronic posting market center internal order book as a hidden market center-restricted buy order which is not displayed on the electronic posting market center public order book;

receiving by the computing system an updated away market best offer price, wherein the updated away market best offer price has moved higher;

retrieving by the computing system a hidden market center-restricted buy order;

determining by the computing system whether the away market best offer price is higher than the price of the hidden market center-restricted buy order; and responsive to determining that the updated away market best offer price is higher than the price of the hidden market center-restricted buy order, the hidden market center-restricted buy order is no longer hidden and is now displayed by the computing system on the electronic posting market center public order book.

18. The method of claim 17, further comprising, responsive to determining that the away market best offer price is higher than the price of the market center-restricted buy order:

inserting by the computing system the market center-restricted buy order into the electronic posting market center internal order book; and displaying by the computing system the market center-restricted buy order on the electronic posting market center public order book.

19. The method of claim 17, further comprising:

receiving by the computing system a sell order on the internal book;

determining by the computing system the marketability of the hidden market center-restricted buy order; and trading by the computing system the hidden market center-restricted buy order against the sell order, if the hidden market center-restricted buy order is marketable.

20. The method of claim 17, wherein the maximum price exemption is 3¢.

21. The method of claim 17, wherein the maximum price exemption is 5¢.

22. The method of claim 17, wherein the maximum price exemption is 0.

23. The method of claim 17, wherein the computing system is one or more programmed computers.

24. The method of claim 17, wherein the computing system is distributed over several physical locations.

25. A method implemented at least partially in a computing system, the method comprising:

providing an electronic posting market center having an internal order book, a public order book, and a maximum price exemption parameter, wherein the maximum price exemption parameter is the price difference between a price at a better-priced market center and a price the electronic posting market center is allowed to trade a financial instrument;

receiving by the computing system a market center-restricted sell order specifying the financial instrument, a price, and that it will only execute on the electronic posting market center;

retrieving by the computing system a best away market bid price in the specified financial instrument, wherein the best away market bid price is the highest offer price for the specified financial instrument on one or more away market centers;

computing by the computing system a maximum valid sell order price by adding the maximum price exemption to the best away market bid price;

determining by the computing system whether the market center-restricted sell order is a valid sell order by comparing the price of the market center-restricted sell order to the maximum valid sell order price, wherein the market-center restricted sell order is a valid sell order if its price is greater than or equal to the maximum valid sell order price;

responsive to determining that the market center-restricted sell order is a valid sell order, determining by the computing system whether the away market best bid price is lower than the price of the market center-restricted sell order; and responsive to determining that the away market best bid price is not lower than the price of the market restricted sell order:

inserting by the computing system the market center-restricted sell order into the electronic posting market center internal order book as a hidden market center-restricted sell order which is not displayed on the electronic posting market center public order book;

receiving by the computing system an updated away market best bid price, wherein the updated away market best bid price has moved lower;

retrieving by the computing system a hidden market center-restricted sell order;

determining by the computing system whether the updated away market best bid price is lower than the price of the hidden market center-restricted sell order; and responsive to determining that the updated away market best bid price is not lower than the price of the hidden market center-restricted sell order:

retrieving by the computing system the maximum price exemption;

computing by the computing system an updated maximum valid sell order price based on the maximum price exemption and the updated best away market bid price;

determining by the computing system whether the hidden market center-restricted sell order is valid; and responsive to determining that the hidden market center-restricted sell order is valid, continuing by the computing system to list the market center-restricted sell order on the electronic posting market center internal order book as a hidden market center-restricted sell order and continuing to not display the market center-restricted sell order on the electronic posting market center public order book.

26. The method of claim 25, further comprising:
receiving by the computing system a buy order on the internal book;
determining by the computing system the marketability of the hidden market center-restricted sell order; and
trading by the computing system the hidden market center-restricted sell order against the buy order, if the hidden market center-restricted sell order is marketable.

27. The method of claim 25, further comprising:
responsive to determining that the away market best bid price is lower than the price of the market center-restricted sell order:
inserting by the computing system the market center-restricted sell order into the electronic posting market center internal order book; and
displaying by the computing system the market center-restricted sell order on the electronic posting market center public order book.

28. The method of claim 25, wherein the maximum price exemption is 3¢.

29. The method of claim 25, wherein the maximum price exemption is 5¢.

30. The method of claim 25, wherein the maximum price exemption is 0.

31. The method of claim 25, wherein the computing system is one or more programmed computers.

32. The method of claim 25, wherein the computing system is distributed over several physical locations.

33. A method implemented at least partially in a computing system, the method comprising:
providing an electronic posting market center having an internal order book, a public order book, and a maximum price exemption parameter, wherein the maximum price exemption parameter is the price difference between a price at a better-priced market center and a price the electronic posting market center is allowed to trade a financial instrument;
receiving by the computing system a market center-restricted sell order specifying the financial instrument, a price, and that it will only execute on the electronic posting market center;
retrieving by the computing system a best away market bid price in the specified financial instrument, wherein the best away market bid price is the highest offer price for the specified financial instrument on one or more away market centers;
computing by the computing system a maximum valid sell order price by adding the maximum price exemption to the best away market bid price;
determining by the computing system whether the market center-restricted sell order is a valid sell order by comparing the price of the market center-restricted sell order to the maximum valid sell order price, wherein the market-center restricted sell order is a valid sell order if its price is greater than or equal to the maximum valid sell order price;
responsive to determining that the market center-restricted sell order is a valid sell order, determining by the computing system whether the away market best bid price is lower than the price of the market center-restricted sell order; and
responsive to determining that the away market best bid price is not lower than the price of the market restricted sell order:
inserting by the computing system the market center-restricted sell order into the electronic posting market center internal order book as a hidden market center-restricted sell order which is not displayed on the electronic posting market center public order book;
receiving by the computing system an updated away market best bid price, wherein the updated away market best bid price has moved lower;
retrieving by the computing system a hidden market center-restricted sell order;
determining by the computing system whether the updated away market best bid price is lower than the price of the hidden market center-restricted sell order; and
responsive to determining that the updated away market best bid price is not lower than the price of the hidden market center-restricted sell order:
retrieving by the computing system the maximum price exemption;
computing by the computing system an updated maximum valid market center-restricted sell order price based on the maximum price exemption and the updated best away market bid price; and
cancelling by the computing system the market center-restricted sell order, if the hidden market center-restricted sell order is invalid.

34. The method of claim 33, further comprising:
receiving by the computing system a buy order on the internal book;
determining by the computing system the marketability of the hidden market center-restricted sell order; and
trading by the computing system the hidden market center-restricted sell order against the buy order, if the hidden market center-restricted sell order is marketable.

35. The method of claim 33, further comprising:
responsive to determining that the away market best bid price is lower than the price of the market center-restricted sell order:
inserting by the computing system the market center-restricted sell order into the electronic posting market center internal order book; and
displaying by the computing system the market center-restricted sell order on the electronic posting market center public order book.

36. The method of claim 33, wherein the maximum price exemption is 3¢.

37. The method of claim 33, wherein the maximum price exemption is 5¢.

38. The method of claim 33, wherein the maximum price exemption is 0.

39. The method of claim 33, wherein the computing system is one or more programmed computers.

40. The method of claim 33, wherein the computing system is distributed over several physical locations.

41. A method implemented at least partially in a computing system, the method comprising:
providing an electronic posting market center having an internal order book, a public order book, and a maximum price exemption parameter, wherein the maximum price exemption parameter is the price difference between a price at a better-priced market center and a price the electronic posting market center is allowed to trade a financial instrument;

receiving by the computing system a market center-restricted sell order specifying the financial instrument, a price, and that it will only execute on the electronic posting market center;

retrieving by the computing system a best away market bid price in the specified financial instrument, wherein the best away market bid price is the highest offer price for the specified financial instrument on one or more away market centers;

computing by the computing system a maximum valid sell order price by adding the maximum price exemption to the best away market bid price;

determining by the computing system whether the market center-restricted sell order is a valid sell order by comparing the price of the market center-restricted sell order to the maximum valid sell order price, wherein the market-center restricted sell order is a valid sell order if its price is greater than or equal to the maximum valid sell order price;

responsive to determining that the market center-restricted sell order is a valid sell order, determining by the computing system whether the away market best bid price is lower than the price of the market center-restricted sell order; and responsive to determining that the away market best bid price is not lower than the price of the market restricted sell order:

inserting by the computing system the market center-restricted sell order into the electronic posting market center internal order book as a hidden market center-restricted sell order which is not displayed on the electronic posting market center public order book;

receiving by the computing system an updated away market best bid price, wherein the updated away market best bid price has moved lower;

retrieving by the computing system a hidden market center-restricted sell order;

determining by the computing system whether the away market best bid price is lower than the price of the hidden market center-restricted sell order; and responsive to determining that the updated away market best bid price is lower than the price of the hidden market center-restricted sell order, the hidden market center-restricted sell order is no longer hidden and is now displayed by the computing system on the electronic posting market center public order book.

42. The method of claim 41, further comprising:

receiving by the computing system a buy order on the internal book;

determining by the computing system the marketability of the hidden market center-restricted sell order; and trading by the computing system the hidden market center-restricted sell order against the buy order, if the hidden market center-restricted sell order is marketable.

43. The method of claim 41, further comprising:

responsive to determining that the away market best bid price is lower than the price of the market center-restricted sell order:

inserting by the computing system the market center-restricted sell order into the electronic posting market center internal order book; and displaying by the computing system the market center-restricted sell order on the electronic posting market center public order book.

44. The method of claim 41, wherein the maximum price exemption is 3¢.

45. The method of claim 41, wherein the maximum price exemption is 5¢.

46. The method of claim 41, wherein the maximum price exemption is 0.

47. The method of claim 41, wherein the computing system is one or more programmed computers.

48. The method of claim 41, wherein the computing system is distributed over several physical locations.

* * * * *